United States Patent
Hogan

(10) Patent No.: US 11,628,649 B2
(45) Date of Patent: Apr. 18, 2023

(54) MUTLI-LAYER PRODUCTS

(71) Applicant: MEDI-Clear Ltd, Hull (GB)

(72) Inventor: Mark Paul Hogan, Hull (GB)

(73) Assignee: MEDI-CLEAR LTD, Hull (GB)

( * ) Notice: Subject to any disclaimer, the term of this patent is extended or adjusted under 35 U.S.C. 154(b) by 0 days.

(21) Appl. No.: 17/569,065

(22) Filed: Jan. 5, 2022

(65) Prior Publication Data
US 2022/0219428 A1 Jul. 14, 2022

(30) Foreign Application Priority Data

Jan. 13, 2021 (GB) ...................................... 2100431

(51) Int. Cl.
*B32B 7/06* (2019.01)
*B32B 3/06* (2006.01)
(Continued)

(52) U.S. Cl.
CPC .................. *B32B 7/06* (2013.01); *B32B 3/06* (2013.01); *B32B 3/266* (2013.01); *B32B 3/30* (2013.01);
(Continued)

(58) Field of Classification Search
CPC .. B32B 7/06; B32B 3/06; B32B 3/266; B32B 3/30; B32B 7/12; B32B 27/08; B32B 2307/748; B32B 2435/02; B32B 29/002; B32B 2439/00; B32B 3/02; B32B 3/10; B32B 27/10; B32B 27/32; B32B 27/36; B32B 29/005; B32B 3/28; B65D 75/327;
(Continued)

(56) References Cited

U.S. PATENT DOCUMENTS

| 7,984,807 | B2 * | 7/2011 | Elliott | ....................... A61J 1/03 206/532 |
| 2013/0299499 | A1 * | 11/2013 | Elliott | .................. B65D 75/327 220/359.1 |
| 2019/0248558 | A1 * | 8/2019 | Hogan | .................. B32B 15/043 |

FOREIGN PATENT DOCUMENTS

| CA | 2264339 | A |   | 5/1999 |   |
| GB | 2366286 | A | * | 3/2002 | ............. B65B 15/00 |

(Continued)

OTHER PUBLICATIONS

Combined Search and Examination Report for Great Britain Application No. GB2100431 2, published by the United Kingdom Intellectual Property Office, dated Jun. 17, 2021, 3 pages.

*Primary Examiner* — Patricia L. Nordmeyer
(74) *Attorney, Agent, or Firm* — Kilyk & Bowersox, P.L.L.C.

(57) ABSTRACT

A multi-layer product as a seal includes a cover layer having an adhesive layer and a backing layer with a release layer. The cover layer has a first part including one or more releasable portions, each having an associated patch. The backing layer has a pre-formed line of separation that extends across the seal from the first edge to the second edge and separates the backing layer into a first part and a second part. The second part of the backing layer includes at least one removable portion at an edge thereof. Each removable portion is defined by one or more pre-formed lines of separation. The cover layer has a second part including at least one flap portion each of which is substantially coincident with a respective one of the removable portions and defined by one or more pre-formed lines of separation in the second part of the cover layer.

15 Claims, 6 Drawing Sheets

(51) Int. Cl.
- *B32B 7/12* (2006.01)
- *B32B 3/26* (2006.01)
- *B32B 3/30* (2006.01)
- *B32B 27/08* (2006.01)
- *B65D 75/32* (2006.01)

(52) U.S. Cl.
CPC ................ *B32B 7/12* (2013.01); *B32B 27/08* (2013.01); *B65D 75/327* (2013.01); *B32B 2307/748* (2013.01); *B32B 2435/02* (2013.01); *B65D 2575/3236* (2013.01)

(58) Field of Classification Search
CPC .......... B65D 2575/3236; B65D 75/325; B65D 17/28
See application file for complete search history.

(56) References Cited

FOREIGN PATENT DOCUMENTS

| | | |
|---|---|---|
| WO | 2006023643 A | 3/2006 |
| WO | 2006079192 A | 8/2006 |

\* cited by examiner

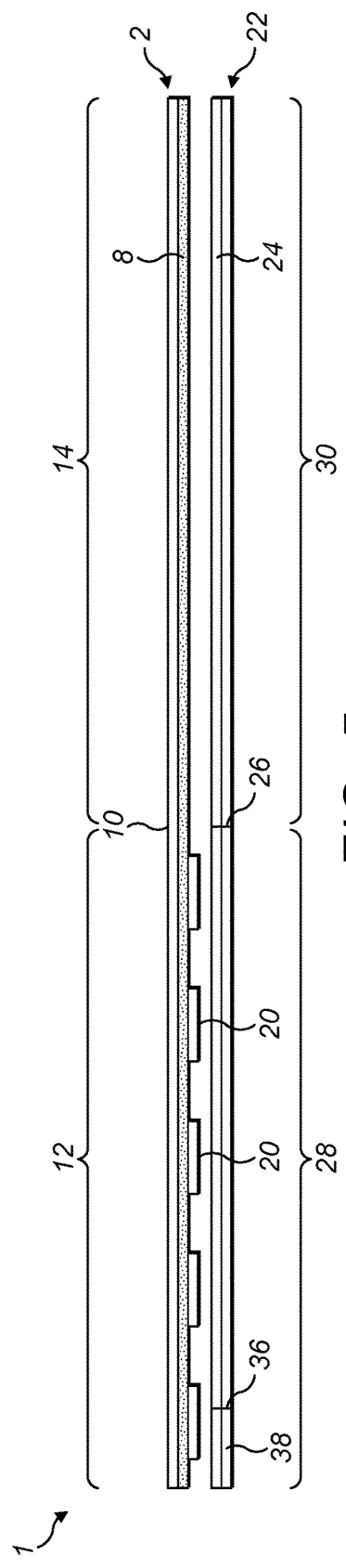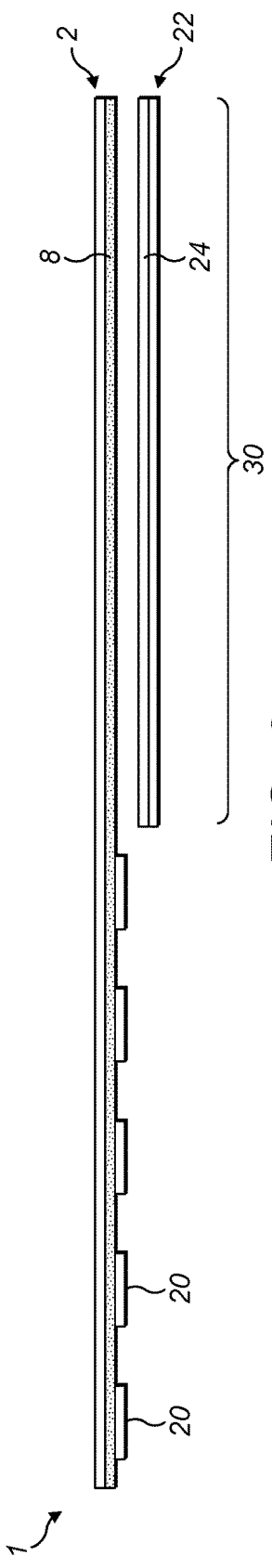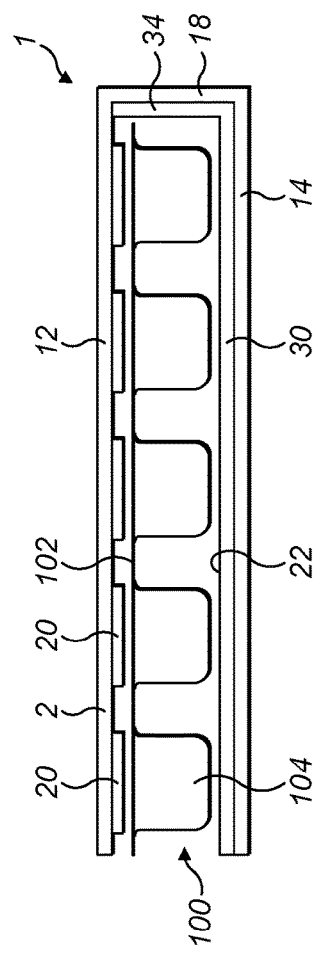

MUTLI-LAYER PRODUCTS

FIELD OF THE INVENTION

The invention relates to multi-layer products, and in particular to multi-layer products that can be used as a seal for use with a container for storing and dispensing consumer products. The term consumer products is intended to cover a wide variety of products as illustrated by the following (non-exhaustive) list: foods, either for immediate consumption, pre-cooked, prepared or oven ready, including prepared meals, confectionary, hardware and DIY items, cosmetics, seeds, animal and fish feeds, electronic components, medical appliances and dressings, medicines and medication such as pills, tablets and capsules.

SUMMARY OF THE INVENTION

The present invention provides a multi-layer product having a first edge and a second edge opposite the first edge, the multi-layer product comprising:
   a. a first layer having a first part with pre-formed lines of separation defining one or more releasable portions, and a second part;
   b. an adhesive layer on the first layer;
   c. one or more patches on the adhesive layer, each patch being associated with a respective one of the one or more releasable portions;
   d. a second layer; and
   e. a release layer between the second layer and the adhesive layer;
   f. wherein the second layer has a pre-formed line of separation that extends across the multi-layer product from the first edge to the second edge and separates the second layer into a first part and a second part, the first part of the second layer being substantially coincident with, and releasably adhered to, the first part of the first layer by means of the adhesive layer, and the second part of the second layer being substantially coincident with the second part of the first layer;
   g. wherein the second part of the second layer includes at least one removable portion at an edge thereof, each removable portion being defined by one or more pre-formed lines of separation in the second part of the second layer; and
   h. wherein the second part of the first layer includes at least one flap portion, each flap portion being substantially coincident with a respective one of the removable portions and being defined by one or more pre-formed lines of separation in the second part of the first layer.

The pre-formed lines of separation defining the one or more releasable portions in the first part of the first layer can be formed by pre-scored or pre-perforated tear lines, cut lines, or a combination thereof.

The pre-formed line of separation in the second layer that extends across the multi-layer product can be a cut line.

The one or more pre-formed lines of separation that define each removable portion in the second layer can be cut lines.

The one or more pre-formed lines of separation that define each flap portion can be cut lines.

Each flap portion is preferably substantially the same size as, or smaller than, the respective removable portion. This is because each flap portion must pass through the gap or "notch" in the second layer that is created when the respective removable portion is removed. Each removable portion and each flap portion can have any suitable shape and size.

In one arrangement, each removable portion and each respective flap portion is substantially rectangular.

The at least one removable portion can be integrally formed with the first part of the second layer. In this case, the removable portion is formed at the edge of the second portion of the second layer that is defined by the pre-formed line of separation in the second layer that extends across the multi-layer product.

The first layer can have a first pre-formed fold line that extends across the multi-layer product from the first edge to the second edge and separates the first layer into the first part and the second part. The first pre-formed fold line is normally coincident with the pre-formed line of separation in the second layer that extends across the multi-layer product. The second part of the first layer can have a second pre-formed fold line that extends across the multi-layer product from the first edge to the second edge, in parallel with the first pre-formed fold line. The second part of the first layer can include a spine part defined between the first and second pre-formed fold lines.

The second part of the second layer can have a pre-formed fold line that extends across the multi-layer product from the first edge to the second edge, in parallel with the pre-formed line of separation. The pre-formed fold line in the second layer is normally coincident with the second pre-formed fold line in the first layer. The second part of the second layer can include a spine part defined between the pre-formed line of separation and the pre-formed fold line. The respective spine parts in the first and second layers are preferably coincident.

The first layer can have a first surface (e.g., an upper surface) and a second surface (e.g., a lower surface). The upper surface of the first layer can define the upper surface of the multi-layer product and the adhesive layer can be applied to the lower surface of the first layer. Any suitable adhesive can be used.

The first layer can be any suitable material of single or multiple-layer construction, e.g., a paper or card sheet, a suitable plastics material such as polypropylene (PP) or polyethylene terephthalate (PET) or bio-based counterparts, or a combination thereof.

The second layer can have a first surface (e.g., a lower surface) and a second surface (e.g., an upper surface). The lower surface of the second layer can define the lower surface of the multi-layer product and the release layer can be applied to the whole of the upper surface of the second layer. The release layer contacts the adhesive layer and allows the first part of the second layer to be peeled away from the adhesive layer cleanly and easily when required. The release layer is removed along with the second layer so that the adhesive layer is exposed. Any suitable release layer or coating can be used, e.g., a commercially-available silicone-based release layer that can be applied to the second surface of the second layer.

In one arrangement, the one or more patches can be formed as part of the second layer. In particular, the first part of the second layer can further comprise pre-formed lines of separation defining the one or more patches, which remain adhered to the adhesive layer if the remainder of the first part of the second layer is peeled away from the adhesive layer. The pre-formed lines of separation defining the one or more patches in the second layer can be formed by pre-scored or pre-perforated tear lines, cut lines, or a combination thereof. In another arrangement, described in more detail below, the one or more patches can be applied separately to the adhesive layer, e.g., as hot melt polymer, and in this case the release layer on the second layer will be in contact with the adhesive layer and the one or more patches. In this other arrangement, the whole of the first part of the second layer is removed with the release layer to expose the patches and the surrounding adhesive layer.

The second layer can be any suitable material of single or multiple-layer construction, e.g., a paper or card sheet, a suitable plastics material such as PP or PET or bio-based counterparts, or a combination thereof.

Each pre-formed fold line in the multi-layer product can be a perforated line.

The various cut lines and perforated lines can be formed in the multi-layer product or seal using any suitable cutting process, for example using die cutters.

Each patch can be aligned with the associated removable portion and can be of any suitable shape. If the multi-layer product includes a plurality of patches, for example, an array of patches corresponding to an array of releasable portions. Each patch can be larger than, or smaller than, the respective releasable portion in the first layer.

Each patch of the multi-layer product can consist of a hot melt polymer.

Each patch can be applied to the adhesive layer using any suitable process such as a coating or spraying process for hot melt polymers. Any suitable hot melt polymer can be used, including a hot melt polymer that might typically be used as a hot melt adhesive. For example, hot melt polymers based on ethylene-vinyl acetate (EVA), polyurethanes or functional polyolefins might be suitable for certain applications.

Each patch will preferably be non-tacky.

The hot melt polymer will preferably be a food-grade polymer.

The present invention further provides a method of using the multi-layer product described above, comprising the steps of:
  a. removing the at least one removable portion in the second part of the second layer to form a gap (or "notch") in the respective edge of the second part of the second layer;
  b. folding each flap portion through the respective gap; and
  c. adhering each flap portion to the second layer by means of the adhesive layer.

At least one edge part of the second part of the second layer is therefore trapped between the second part of the first layer and the folded flap portion. This helps to prevent the second part of the second layer from being removed from the adhesive layer.

The present invention further provides a seal for use with a container for storing and dispensing consumer products comprising a tray having a generally planar top surface into which has been formed one or more discrete cavities for receiving the consumer products, the seal having a first edge and a second edge opposite the first edge and comprising:
  a. a cover layer to seal the one or more cavities to retain the consumer products in the one or more cavities when secured to the generally planar top surface of the tray, the cover layer having a first part with pre-formed lines of separation defining a releasable portion per cavity, and a second part;
  b. an adhesive layer on the cover layer;
  c. one or more patches on the adhesive layer, each patch being associated with a respective one of the one or more releasable portions;
  d. a backing layer; and
  e. a release layer between the backing layer and the adhesive layer;
  f. wherein the backing layer has a pre-formed line of separation that extends across the seal from the first edge to the second edge and separates the backing layer into a first part and a second part, the first part of the backing layer being substantially coincident with, and releasably adhered to, the first part of the cover layer by means of the adhesive layer, and the second part of the backing layer being substantially coincident with the second part of the cover layer;
  g. wherein the second part of the backing layer includes at least one removable portion at an edge thereof, each removable portion being defined by one or more pre-formed lines of separation in the second part of the backing layer; and
  h. wherein the second part of the cover layer includes at least one flap portion, each flap portion being substantially coincident with a respective one of the removable portions and being defined by one or more pre-formed lines of separation in the second part of the cover layer.

Further features of the seal are as described above with reference to the multi-layer product where the cover layer corresponds to the first layer and the backing layer corresponds to the second layer.

The present invention further provides a container for storing and dispensing consumer products, comprising:
  a. a tray having a generally planar top surface into which has been formed one or more discrete cavities for receiving the consumer products; and
  b. a seal as described above where at least part of the first part of the backing layer has been removed and the first part of the cover layer is secured to the generally planar top surface of the tray by the exposed adhesive layer to seal the one or more cavities to retain the consumer products in the one or more cavities.

Each releasable portion and its associated patch overlie a respective discrete cavity of the tray.

The container can be a multiple-compartment container for containing and dispensing medication according to a pre-defined dosage regimen.

The present invention further provides a method of using the seal described above, comprising the steps of:
  a. removing the at least one removable portion in the second part of the backing layer to form a gap (or "notch") in the respective edge of the second part of the backing layer;
  b. folding each flap portion through the respective gap; and
  c. adhering each flap portion to the backing layer by means of the adhesive layer.

At least one edge part of the second part of the backing layer is therefore trapped between the second part of the cover layer and the folded flap portion. This helps to prevent the second part of the backing layer from being removed from the adhesive layer.

The method can further comprise the step of removing at least part of the first part of the backing layer to expose the adhesive layer and adhering the first part of the cover layer to the generally planar top surface of the tray into which has been formed one or more discrete cavities for receiving consumer products. In one arrangement, if the one or more patches are formed as an integral part of the backing layer, they will remain adhered to the adhesive layer when the remainder of the first part of the backing layer is removed to expose the surrounding adhesive layer. If the one or more patches are formed as hot melt polymer, the patches and the surrounding adhesive layer are exposed when the first part of the backing layer is removed.

DRAWINGS

FIG. 5 is a cross section view through a seal according to the present invention with the cover layer of FIGS. 1 and 2 adhered to the backing layer of FIGS. 3 and 4;

FIG. 6 is a cross section view through the seal of FIG. 5 with a first part of the backing layer removed to expose the adhesive layer;

FIG. 7 is a side view showing the seal according to the present invention adhered to a tray to form a dispensing container;

Figure 1:
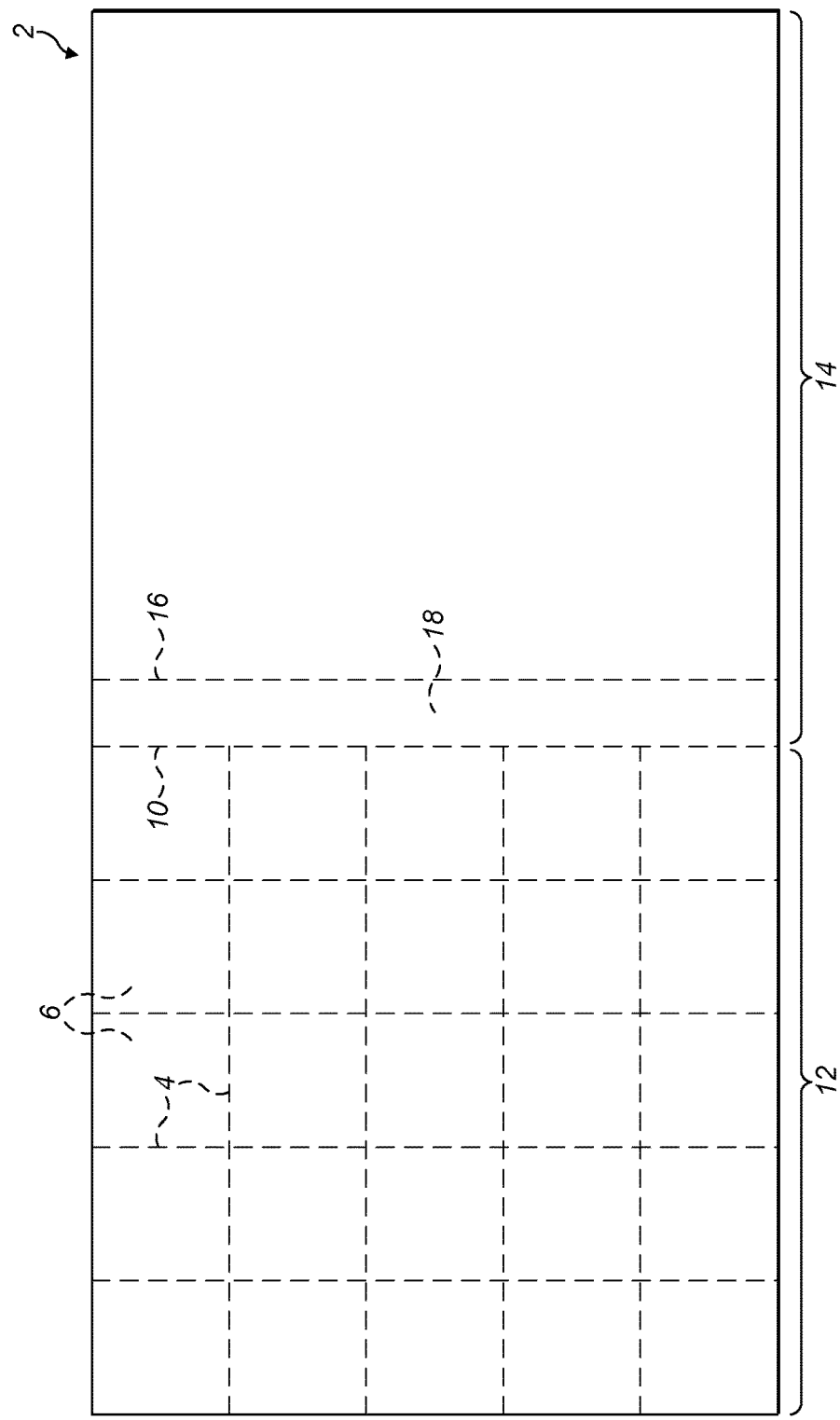
FIG. 1 is a top view of a cover layer with an applied adhesive layer.
Figure 2:
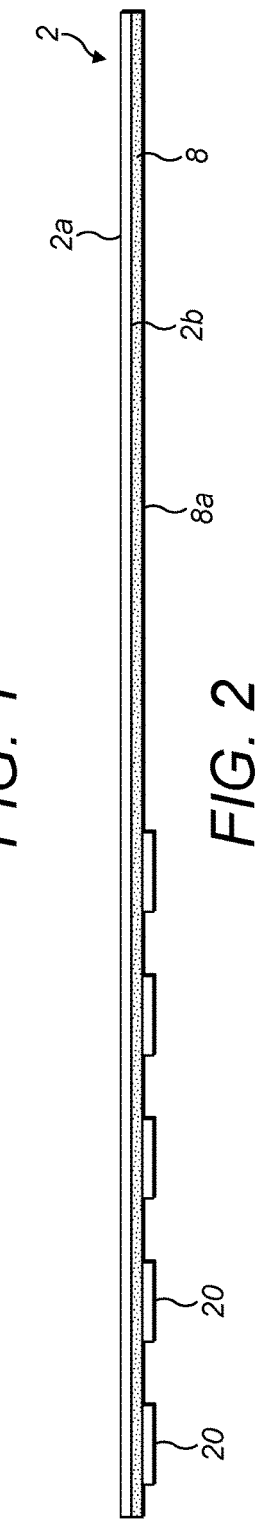
FIG. 2 is a cross section view through the cover layer of FIG. 1.
Figure 3:
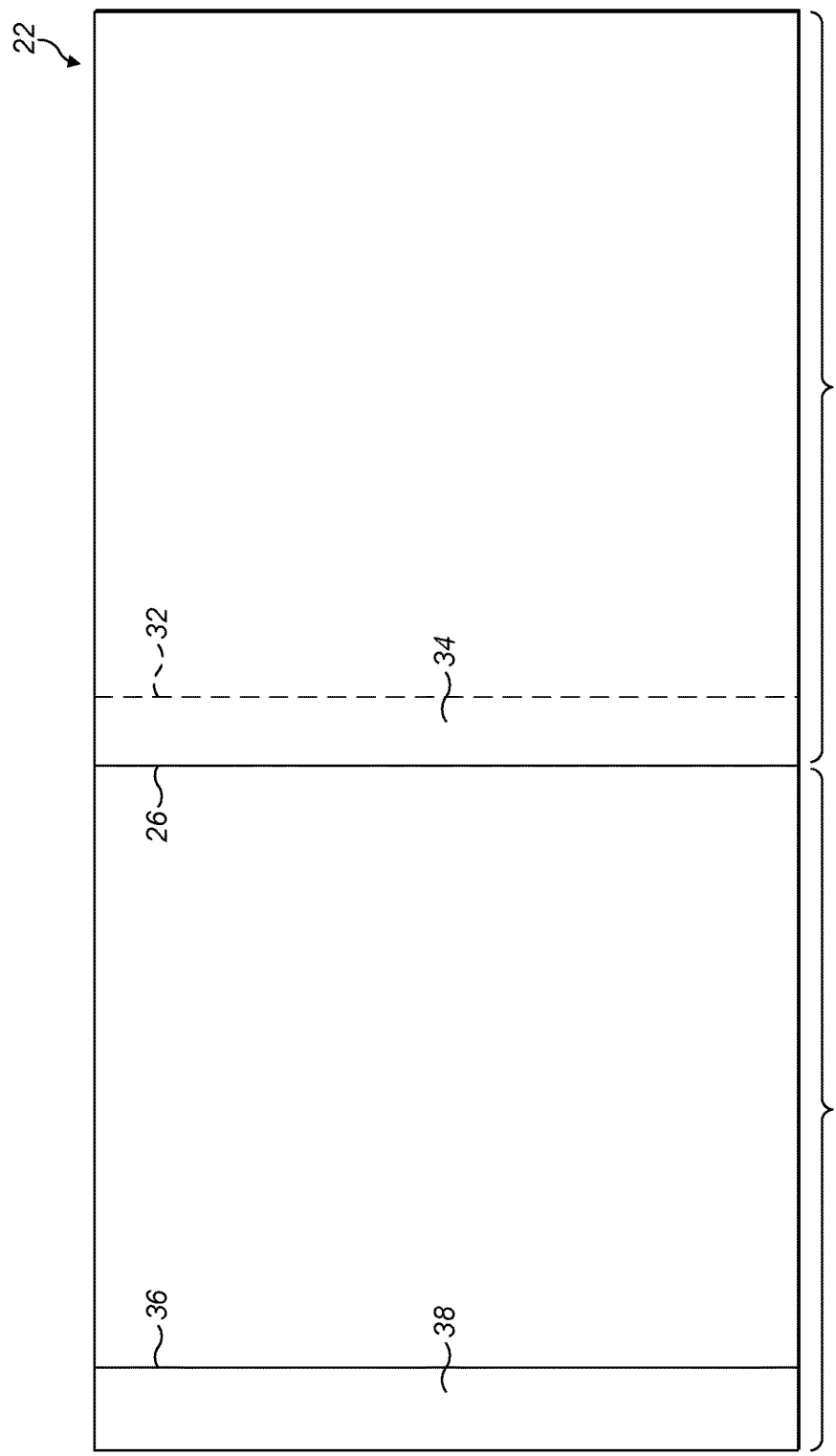
FIG. 3 is a bottom view of a backing layer with an applied release layer.

A seal 1 includes a cover layer 2 of single or multiple-layer construction, e.g., a sheet of paper or card.

The cover layer 2 includes pre-formed lines of separation 4 defining a 5×5 array of releasable portions 6. Each line of separation 4 can be a tear line (e.g., a perforation line) that must be torn or broken to release the releasable portion 6 from the remainder of the cover layer 2. Each perforation line will include a series of cut lines and ties. The pre-formed lines of separation 4 are orthogonal and define substantially square releasable portions 6. It will be readily understood that the pre-formed lines of separation can be in any suitable arrangement and can define any suitable array of releasable portions having any suitable size and shape. In another arrangement, for example, the pre-formed lines of separation define an array of discrete releasable portions that are surrounded by a "skeleton" of the cover layer.

An upper surface 2a of the cover layer 2 defines an upper surface of the seal 1.

An adhesive layer 8 is applied to a lower surface 2b of the cover layer 2.

The cover layer 2 includes a first pre-formed fold line 10 that extends across the cover layer (i.e., from a first edge to a second edge) and separates the cover layer into a first part 12 in which the pre-formed lines of separation 4 are formed, and a second part 14. A second pre-formed fold line 16 extends across the cover layer 2 parallel to the first pre-formed fold line 10 to define a spine part 18. The spine part 18 is part of the second part 14 of the cover layer 2.

A 5×5 array of patches 20 consisting of hot melt polymer are applied to a lower surface 8a of the adhesive layer 8 by a spraying process, for example. Each patch 20 is substantially square and aligned with a respective releasable portion 6. Each patch 20 is smaller than the respective releasable portion 6 as shown and is surrounded by the adhesive layer 8. In another arrangement, for example, the patches can be formed as an integral part of the backing layer described below. The patches are defined by pre-formed lines of separation in the first part of the backing layer and remain adhered to the adhesive layer when the remainder (or "skeleton") of the first part of the backing layer is removed.

The seal 1 further comprises a backing layer 22. A release coating 24 is applied to an upper surface 22a of the backing layer 22. The release coating 24 is adhered to the adhesive layer 8 and contacts the patches 20. A lower surface 22b of the backing layer 22 defines a lower surface of the seal. The release coating 24 can be a commercially-available silicone coating that allows the backing layer 22 to be easily and cleanly removed from the adhesive layer 8 when required. The release coating 24 remains secured to backing layer 22 and is removed with it.

The backing layer 22 includes a first pre-formed cut line 26 that extends across the backing layer 22 (i.e., from a first edge to a second edge) and separates the backing layer into a first part 28 and a second part 30. With the backing layer 22 adhered to the cover layer 2 as shown in FIG. 5, the first pre-formed cut line 26 is coincident with the first pre-formed fold line 10. The first part 28 of the backing layer 22 is coincident with the first part 12 of the cover layer 2. The second part 30 of the backing layer 22 is coincident with the second part 14 of the cover layer 2. The backing layer 22 also includes a pre-formed fold line 32 that extends across the backing layer parallel to the first pre-formed cut line 26 to define a spine part 34. The spine part 34 is part of the second part 30 of the backing layer 22. The pre-formed fold line 32 is coincident with the second pre-formed fold line 16. The spine parts 18 and 34 in the cover and backing layers, respectively, are also coincident.

A second pre-formed cut line 36 extends across the backing layer 22 adjacent an edge of the backing layer and is parallel to the first pre-formed cut line 26. The second pre-formed cut line 36 defines a removable strip 38 of the first part 28 of the backing layer 22.

FIG. 5 shows the seal 1 with the cover layer 2 and the backing layer 22 adhered together. In practice, the release layer 24 is in direct contact with the adhesive layer 8 and the patches 20, but in FIG. 5 they have been spaced slightly apart for clarity.

The pre-formed fold lines 10, 16 and 32 are perforation lines that are designed to help the seal 1 to bend around a tray 100 as described in more detail below.

The various cut lines and perforation lines can be formed in the seal using die cutters with the cover layer 2 and the backing layer 22 adhered together.

In use, the removable strip 38 is removed to expose a corresponding strip of the adhesive layer 8 on the underside of the cover layer 2. This strip of exposed adhesive is used to adhere the edge of the cover layer 2 to a moulded tray 100. The tray 100 has a generally planar top surface 102 into which has been formed a 5×5 array of discrete cavities 104 for receiving consumer products. Adhering the edge of the cover layer 2 to the top surface of the tray as an initial step allows for more accurate positioning and makes it easier to adhere the remainder of the first part 12 of the cover layer 2 in a subsequent step.

The remainder of the first part 28 of the backing layer 22 is then removed to expose the adhesive layer 8 and the patches 20 on the underside of the first part 12 of the cover layer 2 as shown in FIG. 6. (It should be noted that FIG. 6 shows the seal 1 with the first part 28 of the backing layer 22 fully removed but without being adhered to the tray.) Starting from the edge that is already adhered, the remainder of the first part 12 of the cover layer 2 is then adhered to the top surface 102 of the tray 100 to seal the open mouths of the cavities 104. Each patch 20 is aligned with a respective cavity 104. A roller can be used to make sure that the first part 12 of the cover layer 2 is firmly adhered to the tray 100.

The second part 30 of the backing layer 22 remains adhered to the underside of the second part 14 of the cover layer 2.

The non-adhered part of the seal 1 is folded around the tray 100 as shown in FIG. 7 with the coincident spine parts 18, 24 lying along an end of the tray and the second parts 14, 30 of the cover layer 2 and the backing layer 22, respectively, forming a cover sheet of the assembled dispensing container. It can be seen in FIG. 7 that the seal 1 is effectively folded around the tray 100 like a book cover is folded around the page stack. The upper surface 2a of the cover layer 2 can be overprinted with patient or dosage information, for example.

Figure 4:
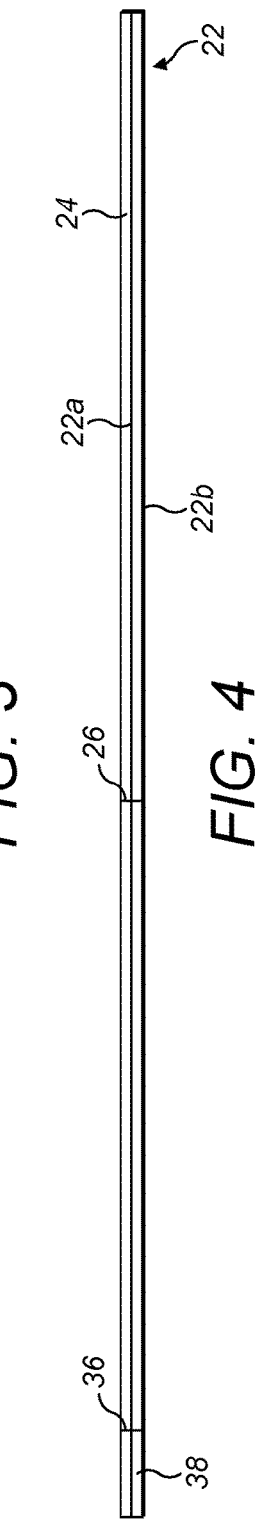
FIG. 4 is a cross section view through the backing layer of FIG. 3.
Figure 8:
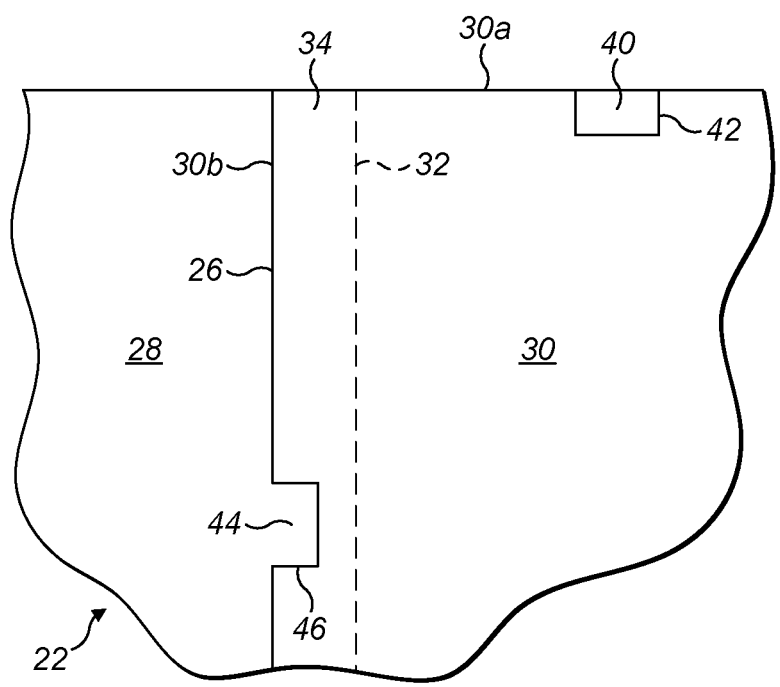
FIG. 8 is a detail bottom view of part of the backing layer showing two removable portions.

With reference to FIG. 8, the second part 30 of the backing layer 22 includes at least one removable portion. Each removable portion is at an edge of the second part 30 of the backing layer 22 and is defined by a respective cut line. FIG. 8 shows two removable portions. A first removable portion 40 in the second part 30 of the backing layer 22 is formed along an edge 30a and is defined by a U-shaped cut line 42. A second removable portion 44 is formed along an edge 30b of the second part of the backing layer that is defined by the cut line 26 that extends across the backing layer 22. The second removable portion 44 is integral with the first part 28 of the backing layer and is defined by a U-shaped cut line 46 that forms part of the cut line 26. (The U-shaped cut line is omitted in FIG. 4 for clarity.) The second removable portion 44 can also be considered in terms of a tab portion of the first part 28 of the backing layer 22.

The first and second removable portions 40, 44 are substantially rectangular and can be about 10 mm long and about 2 mm wide, for example. It will be readily understood that removable portions with different shapes and sizes can also be used.

Figure 9:
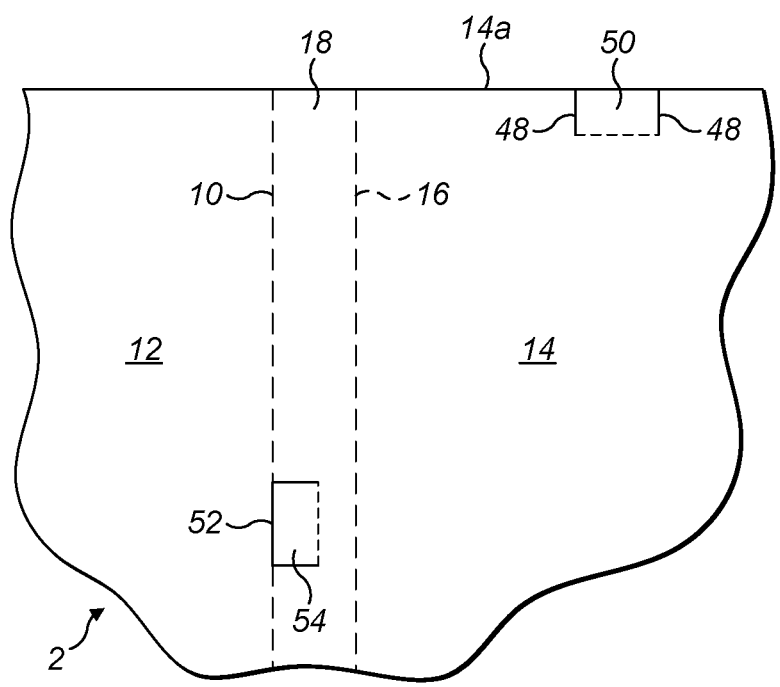
FIG. 9 is a detail top view of part of the cover layer showing two flaps.

FIG. 9 shows the cover layer 2. A pair of cut lines 48 are formed at an edge 14a of the second part 14 of the cover layer 2 to define a first flap 50 which is coincident with the first removable portion 40. A U-shaped cut line 52 is formed in the spine 18 of the cover layer 2 to define a second flap 54 which is coincident with the second removable portion 44.

Figure 10:
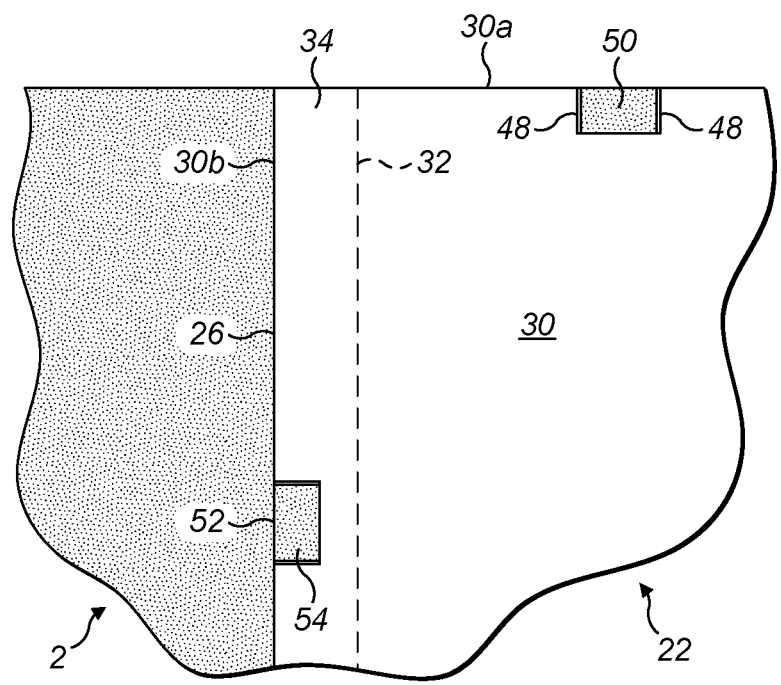
FIG. 10 is a detail bottom view of part of the backing layer after the two removable portions have been removed to expose the adhesive layer and with the flaps showing through the gaps or "notches" in the backing layer.
Figure 11:
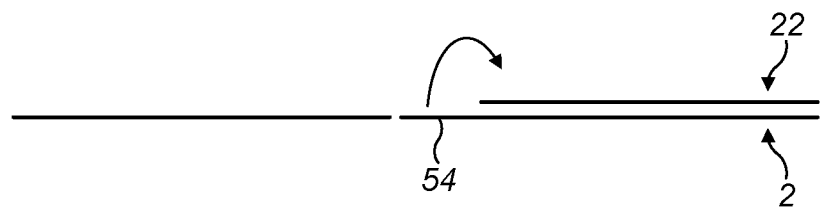
FIG. 11 is a detail cross section view of the part of the backing layer of FIG. 10.

FIG. 10 shows the backing layer 22 after the first part 28 of the backing layer has been removed preparatory to adhering the first part 12 of the cover layer 2 to the tray. Removing the first part 28 of the backing layer 22—and the integral second removable portion 44—exposes the adhesive layer 8 on the underside of the cover layer 2 (indicated in FIG. 10 by the shading) and the patches (not shown in FIG. 10 for clarity). The first removable portion 40 is manually removed to expose the adhesive layer on the underside of the cover layer 2 (indicated in FIG. 10 by the shading). After the first and second removable portions 40, 44 have been removed, the edges 30a, 30b of the second part 30 of the backing layer 22 include first and second gaps or "notches" that are coincident with the first and second flaps 50, 54 formed in the cover layer 2. As shown in FIG. 10, the first and second flaps 50, 54 can be seen through the first and second gaps in the edges 30a, 30b of the second layer.

Figure 12:
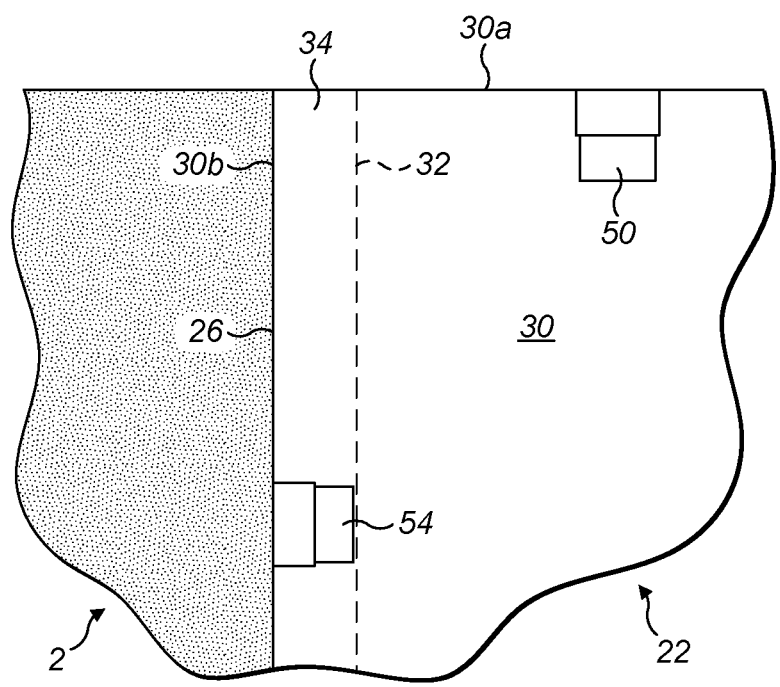
FIG. 12 is a detail bottom view of the part of the backing layer in FIG. 10 after the flaps have been folded through the gaps or "notches" and are adhered to the backing layer.
Figure 13:
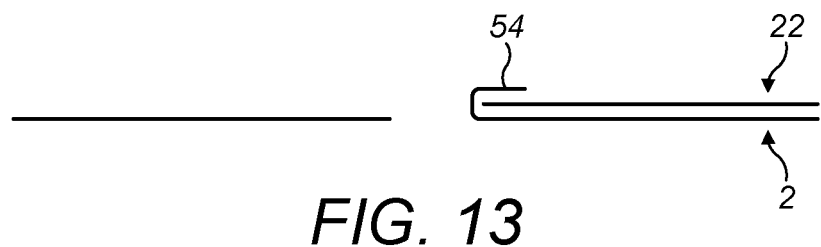
FIG. 13 is a detail cross section view of the part of the backing layer of FIG. 12.

The first and second flaps 50, 54 can then be bent over, along the respective hinge line (see the dotted line in FIG. 9) passing through the gaps in the backing layer 22. The exposed adhesive layer 8 on the first and second flaps 50, 54 can be used to adhere the flaps to the backing layer 22 as shown in FIGS. 12 and 13. Bending the first and second flaps 50, 54 over and onto the lower surface 22b of the backing layer 22 creates a corresponding opening or gap in the cover layer 2. The first and second flaps 50, 54 trap the second part 30 of the backing layer 22 and keep it firmly adhered to the second part 14 of the cover layer 2.

It will be understood that the first and second removable portions 50, 54 are only shown to illustrate the invention. In practice, the second part 30 of the backing layer 22 can include any suitable number of removable portions along one or more of its edges.

The invention claimed is:

1. A multi-layer product having a first edge and a second edge opposite the first edge, the multi-layer product comprising:
  b. a first layer having a first part with pre-formed lines of separation defining one or more releasable portions, and a second part;
  c. an adhesive layer on the first layer;
  d. one or more patches on the adhesive layer, each patch being associated with a respective one of the one or more releasable portions;
  e. a second layer; and
  f. a release layer between the second layer and the adhesive layer;
  g. wherein the second layer has a pre-formed line of separation that extends across the multi-layer product from the first edge to the second edge and separates the second layer into a first part and a second part, the first part of the second layer being substantially coincident with, and releasably adhered to, the first part of the first layer by means of the adhesive layer, and the second part of the second layer being substantially coincident with the second part of the first layer;
  h. wherein the second part of the second layer includes at least one removable portion at an edge thereof, each removable portion being defined by one or more pre-formed lines of separation in the second part of the second layer; and
  i. wherein the second part of the first layer includes at least one flap portion, each flap portion being substantially coincident with a respective one of the removable portions and being defined by one or more pre-formed lines of separation in the second part of the first layer.

2. The multi-layer product of claim 1, wherein the pre-formed line of separation in the second layer that extends across the multi-layer product is a cut line.

3. The multi-layer product of claim 1, wherein the one or more pre-formed lines of separation that define each removable portion in the second layer are cut lines.

4. The multi-layer product of claim 1, wherein the one or more pre-formed lines of separation that define each flap portion are cut lines.

5. The multi-layer product of claim 1, wherein each flap portion is substantially the same size as, or smaller than, the respective removable portion in the second layer.

6. The multi-layer product of claim 1, wherein the at least one removable portion is integrally formed with the first part of the second layer.

7. The multi-layer product of claim 1, wherein the first layer has a first pre-formed fold line that extends across the multi-layer product from the first edge to the second edge and separates the first layer into the first part and the second part, the first pre-formed fold line being coincident with the pre-formed line of separation in the second layer that extends across the multi-layer product.

8. The multi-layer product of claim 7, wherein the second part of the first layer has a second pre-formed fold line that extends across the multi-layer product from the first edge to the second edge, in parallel with the first pre-formed fold line.

9. The multi-layer product of claim 8, wherein the second part of the first layer includes a spine part defined between the first and second pre-formed fold lines.

10. The multi-layer product of claim 8, wherein the second part of the second layer has a pre-formed fold line that extends across the multi-layer product from the first edge to the second edge, the pre-formed fold line being coincident with the second pre-formed fold line in the first layer.

11. The multi-layer product of claim 10, wherein the second part of the second layer includes a spine part defined between the pre-formed line of separation that extends across the multi-layer product from the first edge to the second edge and the pre-formed fold line.

12. The multi-layer product of claim 11, wherein each pre-formed fold line is a perforated line.

13. The multi-layer product of claim 1, wherein each patch consists of a hot melt polymer or is formed as part of the second layer.

14. A method of using a multi-layer product having a first edge and a second edge opposite the first edge, the multi-layer product comprising:
1. a first layer having a first part with pre-formed lines of separation defining one or more releasable portions, and a second part;
2. an adhesive layer on the first layer;
3. one or more patches on the adhesive layer, each patch being associated with a respective one of the one or more releasable portions;
4. a second layer; and
5. a release layer between the second layer and the adhesive layer;
6. wherein the second layer has a pre-formed line of separation that extends across the multi-layer product from the first edge to the second edge and separates the second layer into a first part and a second part, the first part of the second layer being substantially coincident with, and releasably adhered to, the first part of the first layer by means of the adhesive layer, and the second part of the second layer being substantially coincident with the second part of the first layer;
7. wherein the second part of the second layer includes at least one removable portion at an edge thereof, each removable portion being defined by one or more pre-formed lines of separation in the second part of the second layer; and
8. wherein the second part of the first layer includes at least one flap portion, each flap portion being substantially coincident with a respective one of the removable portions and being defined by one or more pre-formed lines of separation in the second part of the first layer j. the method comprising:
k. removing the at least one removable portion in the second part of the second layer to form a gap in the respective edge of the second part of the second layer;
l. folding each flap portion through the respective gap; and
m. adhering each flap portion to the second layer by means of the adhesive layer.

15. A seal for use with a container for storing and dispensing consumer products comprising a tray having a generally planar top surface into which has been formed one or more discrete cavities for receiving the consumer products, the seal having a first edge and a second edge opposite the first edge and comprising:
n. a cover layer to seal the one or more cavities to retain the consumer products in the one or more cavities when secured to the generally planar top surface of the tray, the cover layer having a first part with pre-formed lines of separation defining a releasable portion per cavity, and a second part
o. an adhesive layer on the cover layer;
p. one or more patches on the adhesive layer, each patch being associated with a respective one of the one or more releasable portions;
q. a backing layer; and
r. a release layer between the backing layer and the adhesive layer and the one or more patches;
s. wherein the backing layer has a pre-formed line of separation that extends across the seal from the first edge to the second edge and separates the backing layer into a first part and a second part, the first part of the backing layer being substantially coincident with, and releasably adhered to, the first part of the cover layer by means of the adhesive layer, and the second part of the backing layer being substantially coincident with the second part of the cover layer;
t. wherein the second part of the backing layer includes at least one removable portion at an edge thereof, each removable portion being defined by one or more pre-formed lines of separation in the second part of the backing layer; and
u. wherein the second part of the cover layer includes at least one flap portion, each flap portion being substantially coincident with a respective one of the removable portions and being defined by one or more pre-formed lines of separation in the second part of the cover layer.

* * * * *